US011965311B2

(12) United States Patent
Uchida

(10) Patent No.: US 11,965,311 B2
(45) Date of Patent: Apr. 23, 2024

(54) WORK MACHINE OPERATION APPARATUS AND WORK MACHINE

(71) Applicant: KOMATSU LTD., Tokyo (JP)

(72) Inventor: Naoki Uchida, Tokyo (JP)

(73) Assignee: KOMATSU LTD., Tokyo (JP)

( * ) Notice: Subject to any disclaimer, the term of this patent is extended or adjusted under 35 U.S.C. 154(b) by 393 days.

(21) Appl. No.: 17/414,994

(22) PCT Filed: Nov. 19, 2019

(86) PCT No.: PCT/JP2019/045233
§ 371 (c)(1),
(2) Date: Jun. 17, 2021

(87) PCT Pub. No.: WO2020/166157
PCT Pub. Date: Aug. 20, 2020

(65) Prior Publication Data

US 2022/0064901 A1 Mar. 3, 2022

(30) Foreign Application Priority Data

Feb. 15, 2019 (JP) ................................. 2019-025876

(51) Int. Cl.
*E02F 9/20* (2006.01)
*E02F 9/16* (2006.01)
(Continued)

(52) U.S. Cl.
CPC ............. *E02F 9/2004* (2013.01); *G05G 1/08* (2013.01); *G05G 5/03* (2013.01); *G05G 5/05* (2013.01);
(Continued)

(58) Field of Classification Search
CPC . E02F 9/2004; E02F 9/16; G05G 1/08; G05G 5/03; G05G 5/05; G05G 1/01;
(Continued)

(56) References Cited

U.S. PATENT DOCUMENTS 3,602,245 A 8/1971 Meisel
3,776,330 A 12/1973 De Jongh et al.
(Continued)

FOREIGN PATENT DOCUMENTS

CA 2938774 A1 2/2018
CN 103363091 A 10/2013
(Continued)

*Primary Examiner* — Paul N Dickson
*Assistant Examiner* — Shams Dhanani
(74) *Attorney, Agent, or Firm* — Faegre Drinker Biddle & Reath LLP

(57) ABSTRACT

A work machine operation apparatus that appropriately provides an operational feeling to an operator is provided. A base includes a plurality of first holes each having a first dimension. The base includes a plurality of second holes each having a second dimension different from the first dimension. An interval at which two adjacent first holes are arranged is different from an interval at which two adjacent second holes are arranged. A contact portion is in contact with the base. The contact portion can move relatively to the base and can selectively be engaged with any one of the plurality of first holes and the plurality of second holes. A biasing portion applies to the contact portion, biasing force in a direction in which the contact portion is brought in contact with the base. Upon accepting an input operation, an operational input portion moves the contact portion relatively to the base.

11 Claims, 7 Drawing Sheets

(51) Int. Cl.

| | |
|---|---|
| ***G05G 1/01*** | (2008.04) |
| ***G05G 1/08*** | (2006.01) |
| ***G05G 5/03*** | (2008.04) |
| ***G05G 5/05*** | (2006.01) |
| ***H01H 19/14*** | (2006.01) |

(52) U.S. Cl.
CPC ............... *H01H 19/14* (2013.01); *E02F 9/16* (2013.01); *G05G 1/01* (2013.01); *G05G 2505/00* (2013.01)

(58) Field of Classification Search
CPC .... G05G 2505/00; G05G 5/065; H01H 19/14; H01H 19/11; H01H 3/50
See application file for complete search history.

(56) References Cited

U.S. PATENT DOCUMENTS

| | | | | |
|---|---|---|---|---|
| 4,165,164 | A | 8/1979 | Akasaka | |
| 2002/0080114 | A1 | 6/2002 | Numata et al. | |
| 2015/0287557 | A1 | 10/2015 | Fukunaga | |
| 2016/0085321 | A1 | 3/2016 | Jung | |
| 2018/0203329 | A1 | 7/2018 | Takeshita et al. | |
| 2018/0363774 | A1 | 12/2018 | Yamamoto et al. | |
| 2019/0263447 | A1 | 8/2019 | Nakano et al. | |
| 2021/0010233 | A1* | 1/2021 | Ogata | E02F 9/2004 |
| 2021/0340727 | A1* | 11/2021 | Koshi | B60N 2/767 |
| 2021/0355655 | A1* | 11/2021 | Nakayama | E02F 9/2004 |
| 2022/0118895 | A1* | 4/2022 | Koshi | B60N 2/767 |

FOREIGN PATENT DOCUMENTS

| | | | |
|---|---|---|---|
| CN | 105788935 | A | 7/2016 |
| CN | 105934609 | A | 9/2016 |
| CN | 109099146 | A | 12/2018 |
| JP | S53-160747 | U | 12/1978 |
| JP | S55-124019 | U | 9/1980 |
| JP | S59-092917 | U | 6/1984 |
| JP | 2000-99178 | A | 4/2000 |
| JP | 2000-348568 | A | 12/2000 |
| JP | 2005-344835 | A | 12/2005 |
| JP | 2008-144942 | A | 6/2008 |
| JP | 5914312 | B2 | 5/2016 |
| JP | 2017-136961 | A | 8/2017 |
| JP | 2018-179473 | A | 11/2018 |
| WO | WO 2015/088630 | A1 | 6/2015 |
| WO | WO-2017/047592 | A1 | 3/2017 |
| WO | WO 2019/026153 | A1 | 2/2019 |

* cited by examiner

WORK MACHINE OPERATION APPARATUS AND WORK MACHINE

TECHNICAL FIELD

The present disclosure relates to a work machine operation apparatus and a work machine.

BACKGROUND ART

An apparatus as below has conventionally been proposed. A wheel loader includes a cab. The cab includes a console box in the inside. A switch panel is arranged on an upper surface of the console box. The switch panel includes a vehicle speed range switch (see, for example, Japanese Patent Laying-Open No. 2008-144942 (PTL 1)).

CITATION LIST

Patent Literature

PTL 1: Japanese Patent Laying-Open No. 2008-144942

SUMMARY OF INVENTION

Technical Problem

A wheel loader is demanded to restrict a vehicle speed corresponding to a work. In switching a type of a work, setting of restriction of the vehicle speed is also switched. There is a demand for a wide range where restriction of the vehicle speed is adjusted; for example, the vehicle speed is precisely set on a mud ground, whereas the vehicle speed is not restricted during unloaded travel. On the other hand, there is a demand for ability to set the vehicle speed in small increments or decrements. These demands are desirably satisfied with simple operations.

The present disclosure provides a work machine operation apparatus that can appropriately provide an operational feeling to an operator.

Solution to Problem

According to the present disclosure, a work machine operation apparatus is provided. The operation apparatus includes a base, a contact portion, a biasing portion, and an operational input portion. The base includes a plurality of first engagement portions each having a first dimension. The base includes a plurality of second engagement portions each having a second dimension different from the first dimension. An interval at which two adjacent first engagement portions are arranged is different from an interval at which two adjacent second engagement portions are arranged. The contact portion is in contact with the base. The contact portion moves relatively to the base and can selectively be engaged with any one of the plurality of first engagement portions and the plurality of second engagement portions. The biasing portion applies to the contact portion, biasing force in a direction in which the contact portion is brought in contact with the base. Upon accepting an input operation, the operational input portion moves the contact portion relatively to the base.

Advantageous Effects of Invention

According to the operation apparatus in the present disclosure, an operational feeling can appropriately be provided to an operator.

DESCRIPTION OF EMBODIMENTS

Figure 1:
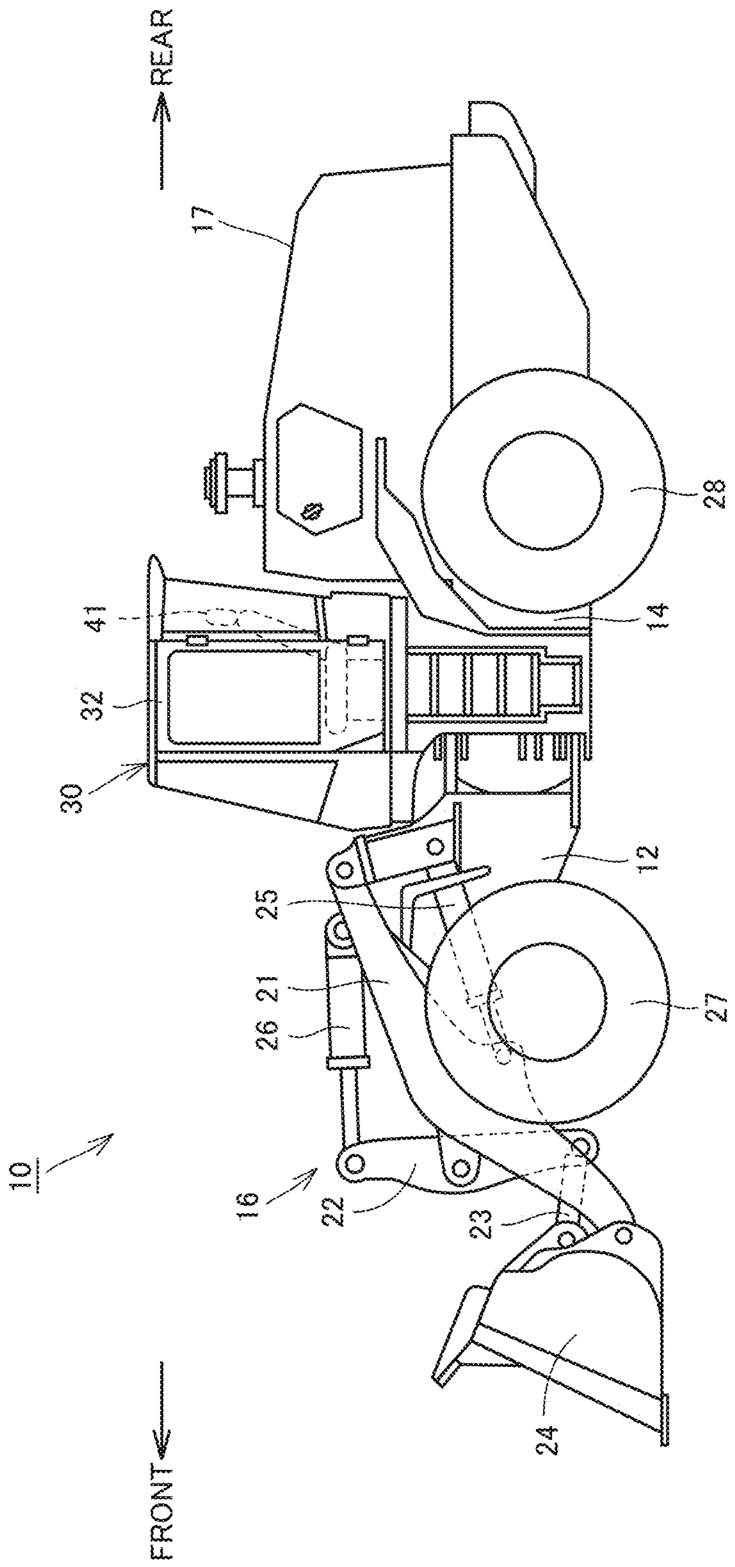
FIG. 1 is a side view showing overview of a construction of a wheel loader based on an embodiment.

An embodiment will be described below with reference to the drawings. The same elements have the same reference characters allotted in the description below and their labels and functions are also the same. Therefore, detailed description thereof will not be repeated.

[Overall Construction]

In an embodiment, a wheel loader 10 will be described by way of example of a work machine to which a concept of the present disclosure is applicable. FIG. 1 is a side view showing overview of a construction of wheel loader 10 based on the embodiment.

As shown in FIG. 1, wheel loader 10 includes a front frame 12, a rear frame 14, a front wheel 27, a rear wheel 28, a work implement 16, a cab (an operator's cab) 30, an operator's seat 41, and an engine hood 17.

A direction in which wheel loader 10 travels in straight lines is herein referred to as a fore/aft direction of wheel loader 10. In the fore/aft direction of wheel loader 10, a side where work implement 16 is arranged with respect to front frame 12 and rear frame 14 is defined as the fore direction and a direction opposite to the fore direction is defined as the aft direction. A lateral direction of wheel loader 10 is a direction orthogonal to the fore/aft direction in a plan view. A right side and a left side in the lateral direction in facing front are defined as a right direction and a left direction, respectively. An upward/downward direction of wheel loader 10 is a direction orthogonal to the plane defined by the fore/aft direction and the lateral direction. A side in the upward/downward direction where the ground is located is defined as a lower side and a side where the sky is located is defined as an upper side.

Front frame 12 and rear frame 14 form a vehicular body frame of an articulated structure. Front frame 12 is provided in front of rear frame 14. Front frame 12 is rotatably connected to rear frame 14 by a central pin (not shown). An axis that extends in the upward/downward direction is defined as a rotation center of front frame 12 with respect to rear frame 14.

Front frame 12 and rear frame 14 are coupled to each other by a steering cylinder (not shown). A pair of left and right steering cylinders is provided. As the steering cylinder is driven to extend and contract, front frame 12 rotates laterally around the central pin.

Front wheel 27 and rear wheel 28 are running wheels of wheel loader 10. Front wheel 27 is provided in front frame 12. A pair of left and right front wheels 27 is provided. Rear wheel 28 is provided in rear frame 14. A pair of left and right rear wheels 28 is provided.

Work implement 16 is provided in front frame 12. Work implement 16 includes a boom 21, a bucket 24, a boom cylinder 25, a bell crank 22, a bucket cylinder 26, and a link 23.

Cab 30 and engine hood 17 are provided in rear frame 14. Cab 30 is provided in the rear of work implement 16. Engine hood 17 is provided in the rear of cab 30. Engine hood 17 accommodates a hydraulic oil tank, an engine, a hydraulic pump, an air cleaner, and the like.

Cab 30 delimits an indoor space which an operator enters. A door 32 is provided in a side surface of cab 30. Door 32 is opened and closed when the operator enters or goes out of cab 30. Operator's seat 41 is provided in the indoor space delimited by cab 30. The operator sits in operator's seat 41 in cab 30 and performs an operation to travel wheel loader 10 and operates work implement 16.

[Construction of Inside of Cab 30]

Figure 2:
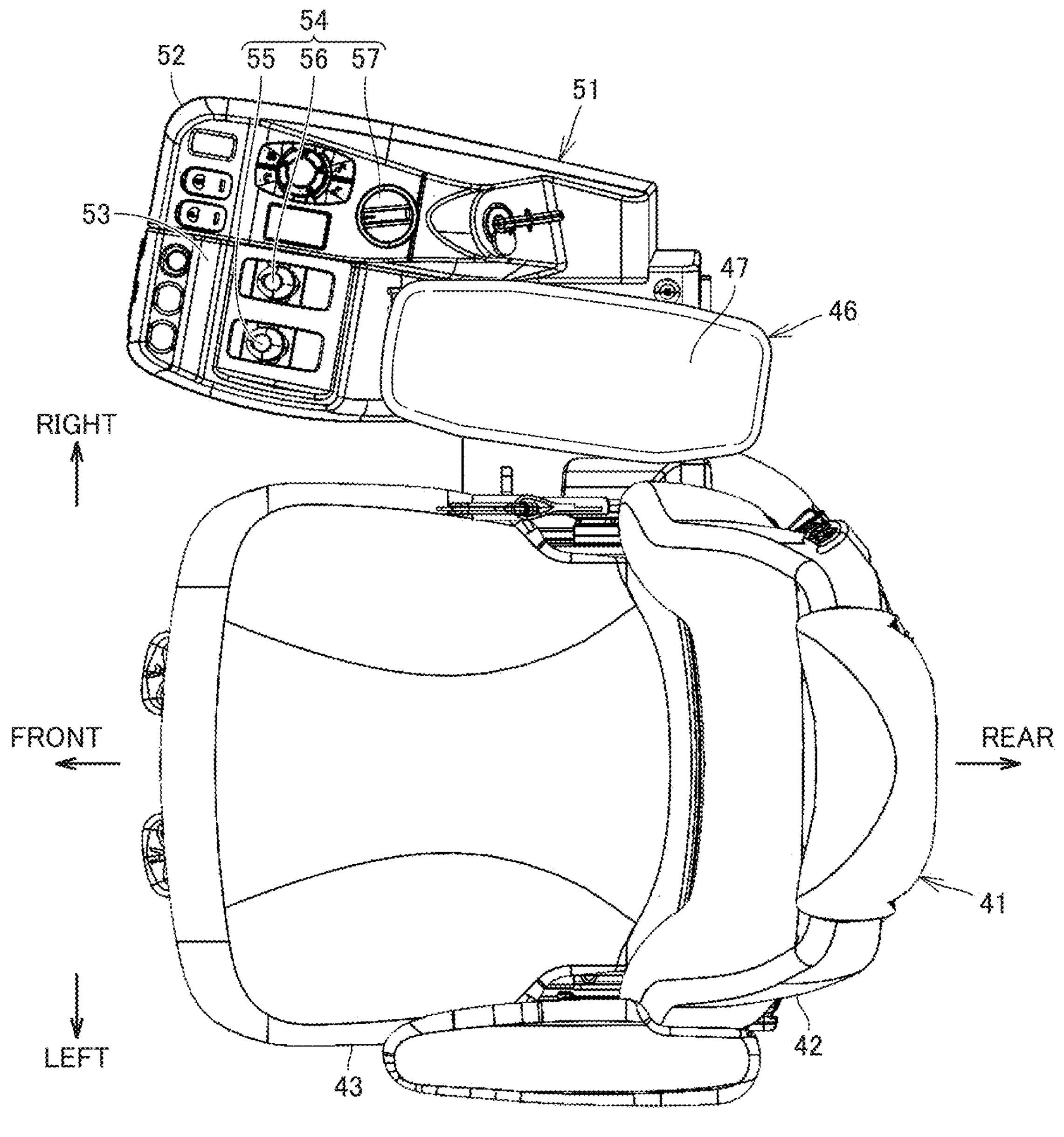
FIG. 2 is a plan view showing a construction around an operator's seat in a cab shown in FIG. 1.

FIG. 2 is a plan view showing a construction around the operator's seat in cab 30 shown in FIG. 1. As shown in FIG. 2, operator's seat 41 includes a seat cushion 43 and a seat back 42. Seat cushion 43 is a seat part in which an operator sits down. Seat back 42 is provided to rise upward from a rear end of seat cushion 43. Seat back 42 is a seat part serving as a backrest for an operator.

A steering wheel, an accelerator pedal, a brake pedal, and a monitor (none of which is shown) are provided in front of operator's seat 41 in cab 30. An armrest 46 and a console 51 are arranged on a right side of operator's seat 41 in cab 30.

Console 51 includes a housing portion 52. Housing portion 52 is in a shape of a housing and defines an appearance of console 51. Housing portion 52 and seat cushion 43 are laterally aligned. Housing portion 52 is aligned at a distance from seat cushion 43 in the lateral direction.

Housing portion 52 includes an upper surface 53. An operation portion 54 is provided on upper surface 53. The operator controls an operation by wheel loader 10, more specifically, travel of wheel loader 10 and an operation by work implement 16, by operating operation portion 54. Operation portion 54 includes control levers 55 and 56 operated for controlling an operation by work implement 16 (boom 21 and bucket 24) and a dial apparatus 57 operated for controlling travel of wheel loader 10.

Control levers 55 and 56 are provided as being slidable in the fore/aft direction. Dial apparatus 57 is provided to be turned. Dial apparatus 57 is arranged as being more distant from operator's seat 41 than control levers 55 and 56. Dial apparatus 57 is arranged in the rear of control levers 55 and 56.

Armrest 46 is used as a support for an operator's elbow. Armrest 46 is arranged above upper surface 53 of console 51. Armrest 46 includes an upper surface 47. Upper surface 47 serves as an elbow support surface on which the elbow of the operator is placed.

[Construction of Dial Apparatus 57]

Figure 3:
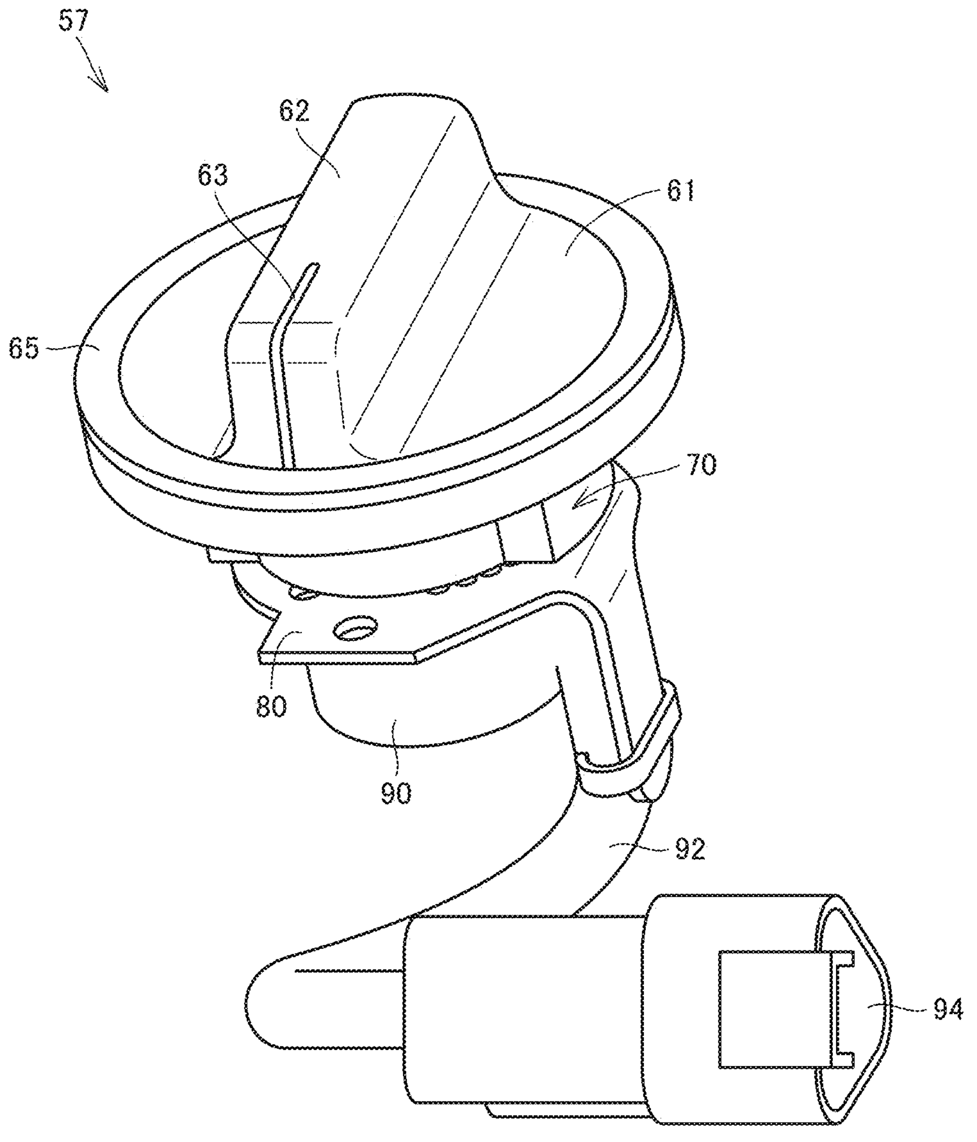
FIG. 3 is a perspective view of a dial.
Figure 4:
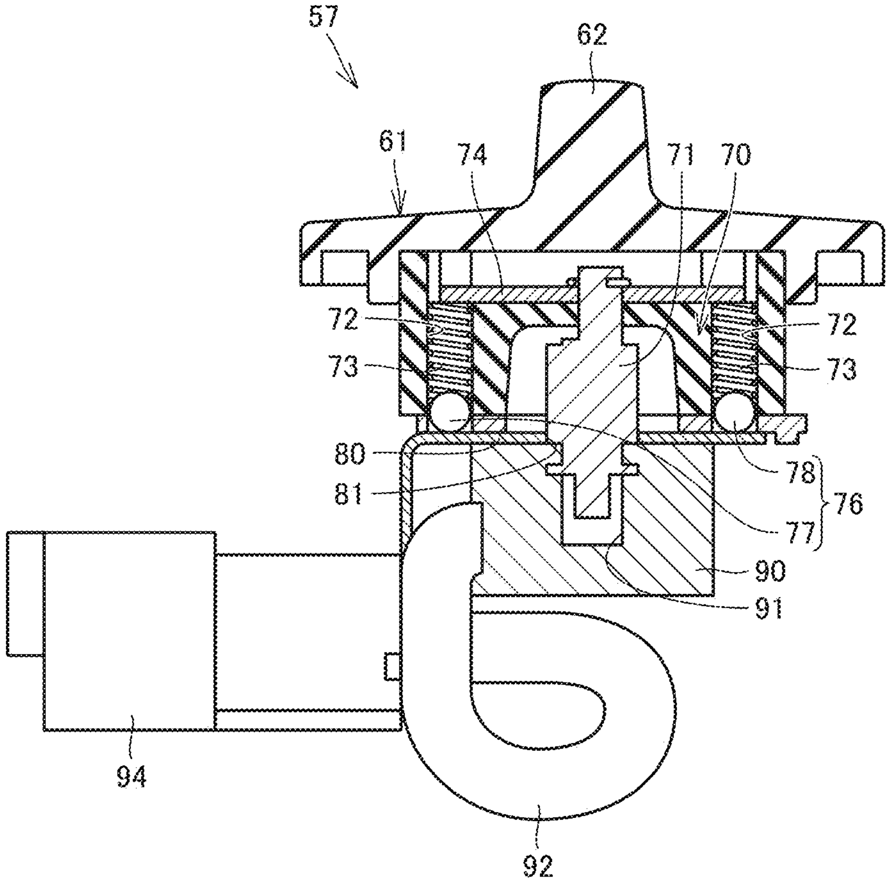
FIG. 4 is a partial cross-sectional view of the dial.

Details of a construction of dial apparatus 57 representing an exemplary operation apparatus based on the embodiment will then be described. FIG. 3 is a perspective view of dial apparatus 57. FIG. 4 is a partial cross-sectional view of dial apparatus 57.

As shown in FIGS. 3 and 4, dial apparatus 57 includes a dial main body 61. Dial main body 61 is formed substantially circularly in a plan view. Dial main body 61 is surrounded by an annular attachment ring portion 65. Attachment ring portion 65 is fixed to console 51. Dial main body 61 is turnable with respect to attachment ring portion 65 within a certain range of angles in two directions. Dial main body 61 is turnable relatively to console 51.

An operation knob 62 is formed integrally with dial main body 61. Operation knob 62 is in a shape like a ridge that rises upward from dial main body 61 and extends over the entire diameter of substantially circular dial main body 61. The operator rotationally operates dial apparatus 57 by turning operation knob 62 by holding operation knob 62 with his/her fingers, for example, between his/her thumb and forefinger.

A reference mark 63 is provided at one end of operation knob 62. Reference mark 63 indicates a position in a direction of turning of operation knob 62. Reference mark 63 indicates an adjustment position of dial main body 61 with respect to console 51. An adjustment amount indicator indicating an amount of adjustment corresponding to an adjustment position of dial main body 61 may be formed in attachment ring portion 65 or console 51.

A rotational operation portion 70 is provided below dial main body 61. Rotational operation portion 70 is attached to dial main body 61 and rotates together with dial main body 61 when dial main body 61 is turned. Rotational operation portion 70 is rotatable relatively to console 51. Rotational operation portion 70 includes a shaft portion 71, a spring portion 73, a pressing portion 74, and a contact portion 76.

Shaft portion 71 extends downward from dial main body 61. Shaft portion 71 is arranged concentrically with a rotation center of dial main body 61. Shaft portion 71 is attached to the rotation center of dial main body 61.

A guide cylinder 72 that extends in the upward/downward direction is formed in rotational operation portion 70. Guide cylinder 72 is hollow and cylindrical, and provided at at least one location in rotational operation portion 70. In rotational operation portion 70 shown in FIG. 4, guide cylinder 72 is formed at two locations at positions in point symmetry with respect to the rotation center of dial main body 61.

Spring portion 73 and contact portion 76 are accommodated in each guide cylinder 72. Spring portion 73 is a coil spring, and compressible and extendible in the upward/downward direction which is a direction of extension of guide cylinder 72. Pressing portion 74 is arranged at an upper end of guide cylinder 72. An upper end of spring portion 73 abuts on pressing portion 74. A lower end of spring portion 73 abuts on contact portion 76. Contact portion 76 is movable in the upward/downward direction with compression and extension of spring portion 73. Pressing portion 74 is immovable in the upward/downward direction.

Contact portion 76 includes a first ball 77 accommodated in one of guide cylinders 72 at the two locations and a second ball 78 accommodated in the other of guide cylinders 72 at the two locations. First ball 77 and second ball 78 are spherical. First ball 77 and second ball 78 are equal to each other in diameter. First ball 77 and second ball 78 are identical to each other in shape.

A base 80 is provided below rotational operation portion 70. Rotational operation portion 70 is arranged between dial main body 61 and base 80. Contact portion 76 is in contact with an upper surface of base 80. Spring portion 73 applies downward biasing force to contact portion 76. Spring portion 73 applies to contact portion 76, biasing force in a direction in which contact portion 76 is brought in contact with base 80. Spring portion 73 corresponds to the biasing portion in the embodiment.

Unlike dial main body 61 and rotational operation portion 70, base 80 is unable to rotate relatively to console 51. As the operator operates dial main body 61, dial main body 61 and rotational operation portion 70 rotate relatively to console 51, and at this time, contact portion 76 moves relatively to base 80. Contact portion 76 slides with respect to base 80 as relatively rubbing the base, while it maintains contact with base 80. The operational input portion in the embodiment that moves contact portion 76 relatively to base 80 upon accepting an input operation is constructed of dial main body 61 operated by the operator and shaft portion 71 serving as a rotation center shaft of dial main body 61 and rotational operation portion 70.

An insertion hole 81 is provided in base 80. Insertion hole 81 passes through base 80 in a direction of thickness. Shaft portion 71 is inserted in insertion hole 81. Shaft portion 71 is arranged to pass through insertion hole 81.

A potentiometer 90 is attached to a lower surface of base 80. A shaft hole 91 is provided in potentiometer 90. Shaft hole 91 communicates with insertion hole 81 in base 80. Potentiometer 90 is positioned with respect to base 80 such that shaft hole 91 is concentric with insertion hole 81. Shaft portion 71 is inserted in shaft hole 91. Shaft portion 71 has a lower end arranged in shaft hole 91.

Potentiometer 90 converts an amount of relative displacement of shaft portion 71 into an electrical signal. Potentiometer 90 converts an angle of rotation of shaft portion 71, that is, an angle of rotation of dial main body 61 and rotational operation portion 70, into an electrical signal. Potentiometer 90 detects the angle of rotation of dial main body 61 and rotational operation portion 70 and provides a voltage corresponding to the angle of rotation.

One end of a cable 92 is connected to potentiometer 90. The other end of cable 92 is connected to a terminal 94. Potentiometer 90 and terminal 94 are electrically connected to each other through cable 92. An electrical signal corresponding to an angle of rotation detected by potentiometer 90 is provided to the outside through terminal 94.

[Construction of Base 80]

Figure 5:
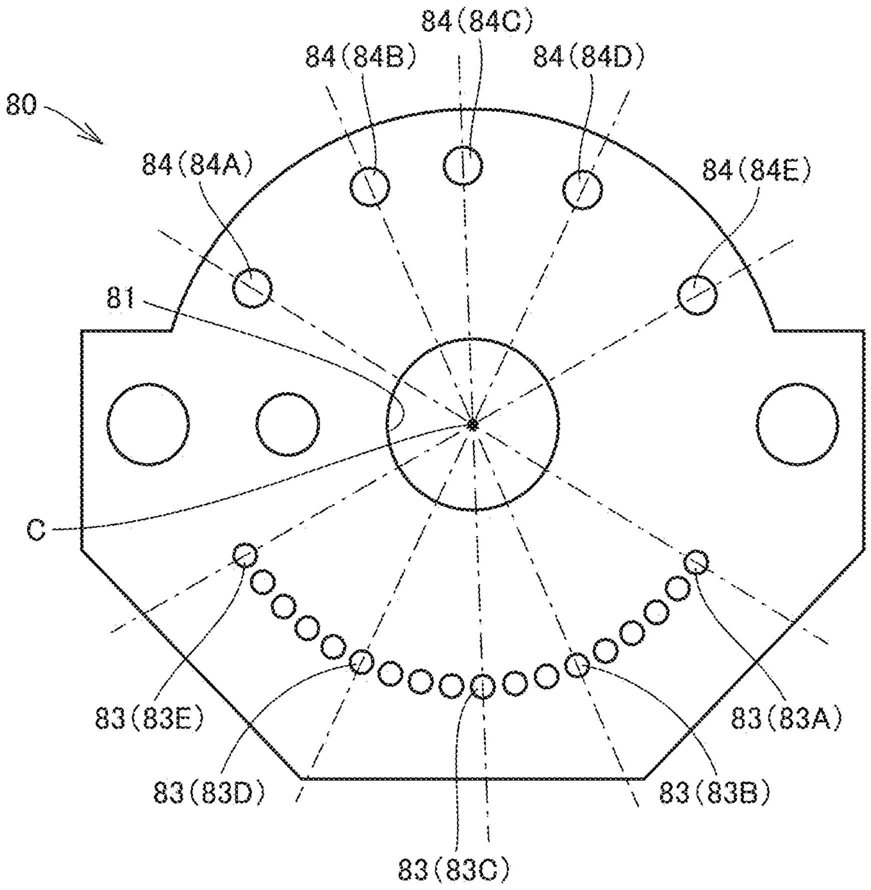
FIG. 5 is a plan view of a base.

FIG. 5 is a plan view of base 80. In base 80, a first hole 83 and a second hole 84 in addition to insertion hole 81 described with reference to FIG. 4 are provided.

First hole 83 and second hole 84 are each in a circular shape in a plan view. Second hole 84 is different in diameter from first hole 83. Second hole 84 is larger in diameter than first hole 83. Second hole 84 is provided as being larger in diameter than first hole 83. Second hole 84 is different in dimension from first hole 83.

A plurality of first holes 83 are provided. In the example shown in FIG. 5, eighteen first holes 83 are provided in base 80. A plurality of second holes 84 are provided. In the example shown in FIG. 5, five second holes 84 are provided in base 80. First holes 83 larger in number than second holes 84 are provided.

The plurality of first holes 83 are arranged as being aligned. The plurality of second holes 84 are arranged as being aligned at positions different from positions of first holes 83. First holes 83 and second holes 84 are arranged with insertion hole 81 lying therebetween.

A center C shown in FIG. 5 indicates the center of insertion hole 81. The plurality of first holes 83 are arranged as being aligned along an arc around center C. The plurality of second holes 84 are arranged as being aligned along an arc around center C. The plurality of first holes 83 and the plurality of second holes 84 are arranged as being aligned on an identical circle around center C.

The plurality of first holes 83 are arranged at regular intervals. The plurality of second holes 84 are arranged at irregular intervals. An interval at which two adjacent first holes 83 are arranged is different from an interval at which two adjacent second holes 84 are arranged. The plurality of first holes 83 are all equal in distance between centers. The plurality of second holes 84 are not all equal in distance between centers but includes at least one second hole 84 different in distance between centers.

Five chain dotted lines shown in FIG. 5 indicate straight lines that pass through centers of five second holes 84 and center C representing the center of insertion hole 81. A chain dotted line that passes through the center of a second hole 84A passes through the center of a first hole 83A. A chain dotted line that passes through the center of a second hole 84B passes through the center of a first hole 83B. A chain dotted line that passes through the center of a second hole 84C passes through the center of a first hole 83C. A chain dotted line that passes through the center of a second hole 84D passes through the center of a first hole 83D. A chain dotted line that passes through the center of a second hole 84E passes through the center of a first hole 83E.

Four first holes 83 are provided between first hole 83A and first hole 83B. Two first holes 83 are provided between first hole 83B and first hole 83C. Three first holes 83 are provided between first hole 83C and first hole 83D. Four first holes 83 are provided between first hole 83D and first hole 83E.

Therefore, an interval between second hole 84A and second hole 84B is larger than an interval between second hole 84B and second hole 84C. An interval between second hole 84C and second hole 84D is smaller than the interval between second hole 84A and second hole 84B and larger than the interval between second hole 84B and second hole 84C. An interval between second hole 84D and second hole 84E is equal to the interval between second hole 84A and second hole 84B. Second holes 84 are thus arranged at irregular intervals.

Figure 6:
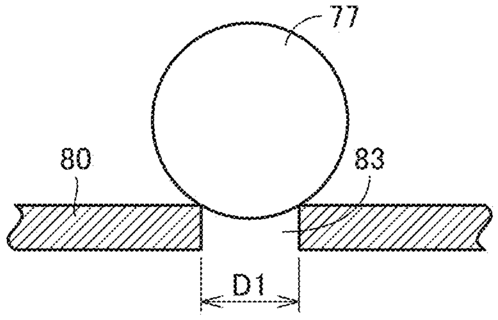
FIG. 6 is a schematic diagram showing engagement of a ball with a first hole.
Figure 7:
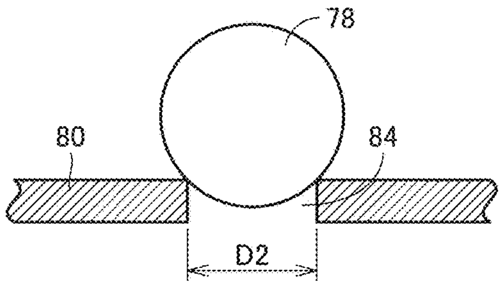
FIG. 7 is a schematic diagram showing engagement of a ball with a second hole.

FIG. 6 is a schematic diagram showing engagement of first ball 77 with first hole 83. FIG. 7 is a schematic diagram showing engagement of second ball 78 with second hole 84. First ball 77 can selectively be engaged with any one of the plurality of first holes 83. Second ball 78 can selectively be engaged with any one of the plurality of second holes 84. First hole 83 corresponds to the first engagement portion in the embodiment. Second hole 84 corresponds to the second engagement portion in the embodiment.

A diameter D1 shown in FIG. 6 represents a diameter of first hole 83. A diameter D2 shown in FIG. 7 represents a diameter of second hole 84. Diameter D1 corresponds to the first dimension in the embodiment. Diameter D2 corresponds to the second dimension in the embodiment.

Diameter D2 of second hole 84 is larger than diameter D1 of first hole 83. A depth of entry of second ball 78 into second hole 84 in engagement of second ball 78 with second hole 84 is larger than a depth of entry of first ball 77 into first hole 83 in engagement of first ball 77 with first hole 83. Force necessary for getting second ball 78 out of second hole 84 and disengaging second ball 78 from second hole 84 is larger than force necessary for getting first ball 77 out of first hole 83 and disengaging first ball 77 from first hole 83.

As described with reference to FIG. 4, guide cylinders 72 at two locations are formed at positions in point symmetry with respect to the rotation center of dial main body 61. First ball 77 accommodated in one of guide cylinders 72 at the two locations and second ball 78 accommodated in the other of guide cylinders 72 at the two locations are arranged at positions in point symmetry with respect to the rotation center of dial main body 61.

Referring also to FIG. 5, in rotational movement of first ball 77 and second ball 78 relative to base 80 around center C, there are a case in which first ball 77 is engaged with first hole 83 and second ball 78 is engaged with second hole 84 and a case in which first ball 77 is engaged with first hole 83 but second ball 78 is not engaged with second hole 84. For example, when first ball 77 is engaged with first hole 83A, second ball 78 is engaged with second hole 84A. When first ball 77 moves to be engaged with first hole 83 adjacent to first hole 83A, second ball 78 is located between second hole 84A and second hole 84B and it is engaged with none of second holes 84.

When second ball 78 is not engaged with second hole 84, torque necessary for turning dial main body 61 should only be large enough to get first ball 77 out of first hole 83. When second ball 78 is engaged with second hole 84, torque necessary for turning dial main body 61 is required to be large enough to get second ball 78 out of second hole 84.

With a relatively strong click feel produced when second ball 78 fits in second hole 84, the operator who operates dial main body 61 can recognize engagement of second ball 78 with any of second holes 84. The operator can recognize, also based on relatively large operating force required for disengaging second ball 78 from second hole 84, engagement of second ball 78 with any of second holes 84. With a relatively light click feel and turning of dial main body 61 with relatively small operating force, the operator can recognize that second ball 78 is not engaged with second hole 84 but first ball 77 is engaged with first hole 83.

Thus, the operator who operates dial main body 61 can be given operational feelings different between the case in which first ball 77 is engaged with first hole 83 but second ball 78 is not engaged with second hole 84 and the case in which first ball 77 is engaged with first hole 83 and second ball 78 is engaged with second hole 84. Therefore, a feeling at the time of operation of dial apparatus 57 can appropriately be given to the operator. The operator can perceive whether or not second ball 78 is engaged with second hole 84 based on his/her feeling at fingertips, without looking at dial apparatus 57.

When first holes 83 and second holes 84 different in dimension are aligned in a random order, a distance between circumferences of holes is different between a portion where two first holes 83 are adjacent to each other and a portion where first hole 83 and second hole 84 are adjacent to each other. Since first holes 83 and second holes 84 are arranged at different positions in base 80 in the embodiment, the plurality of first holes 83 can be provided at regular intervals. The interval between first holes 83 can thus be made smaller in consideration of limit of accuracy in machining.

Since the plurality of first holes 83 and the plurality of second holes 84 are arranged with insertion hole 81 lying therebetween, balance in base 80 where first holes 83 and second holes 84 are provided can be improved.

Since first holes 83 and second holes 84 are arranged as being aligned along the arc around center C, contact portion 76 that moves along an arc trace as dial main body 61 is operated can reliably selectively be engaged with any one of the plurality of first holes 83 and the plurality of second holes 84.

Figure 8:
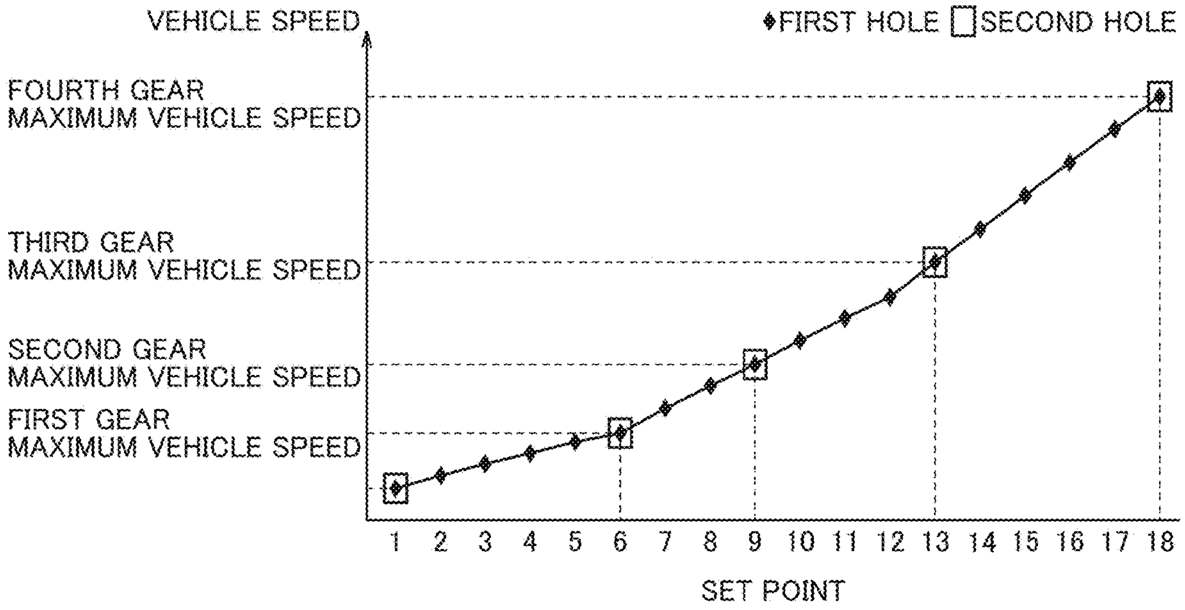
FIG. 8 shows a graph of vehicle speed restriction in response to a dial operation.

FIG. 8 shows a graph of vehicle speed restriction in response to a dial operation. The abscissa in the graph in FIG. 8 corresponds to eighteen set points corresponding to positions where eighteen first holes 83 are provided. The eighteen set points correspond to positions where an operational feeling is obtained as a result of engagement of first ball 77 with first hole 83 in operating dial main body 61. The ordinate in the graph in FIG. 8 represents a vehicle speed of wheel loader 10.

Rhombic plots in FIG. 8 represent eighteen first holes 83 provided at set points from 1 to 18. Hollow rectangular plots in FIG. 8 represent set points where five second holes 84 are provided. Second holes 84 are provided at first, sixth, ninth, thirteenth, and eighteenth set points of the eighteen set points. The first, sixth, ninth, thirteenth, and eighteenth set points correspond to positions where different operational feelings are obtained as a result of engagement of second ball 78 with second hole 84 when dial main body 61 is operated.

Referring also to FIG. 5, first hole 83A and second hole 84A are provided at the first set point. First holes 83 are provided but no second hole 84 is provided at the second to fifth set points. First hole 83B and second hole 84B are provided at the sixth set point. First holes 83 are provided and no second hole 84 is provided at the seventh and eighth set points. First hole 83C and second hole 84C are provided at the ninth set point.

First holes 83 are provided and no second hole 84 is provided at the tenth to twelfth set points. First hole 83D and second hole 84D are provided at the thirteenth set point. First holes 83 are provided and no second hole 84 is provided at the fourteenth to seventeenth set points. First hole 83E and second hole 84E are provided at the eighteenth set point.

Dial apparatus 57 in the embodiment is a vehicle speed restriction dial operated for defining a maximum value of the vehicle speed at which wheel loader 10 travels. The sixth set point can be set as a maximum vehicle speed in a forward first gear. The ninth set point can be set as a maximum vehicle speed in a forward second gear. The thirteenth set point can be set as a maximum vehicle speed in a forward third gear. The eighteenth set point can be set as a maximum vehicle speed in a forward fourth gear.

The operator can perceive based on his/her feeling at the fingertips in which of the forward first gear, second gear, third gear, and fourth gear the maximum vehicle speed has been set with the use of the vehicle speed restriction dial, without looking at dial apparatus 57. In addition, by changing setting as to with which of first holes 83 first ball 77 is to be engaged, the maximum vehicle speed can more finely be set at each gear position. In the forward first gear, vehicle speed setting in six stages corresponding to the first to sixth set points can be made. Therefore, the vehicle speed in a case in which a low maximum vehicle speed is defined such as travel of wheel loader 10 on a mud ground or snow removal works by wheel loader 10 can precisely be set.

Figure 9:
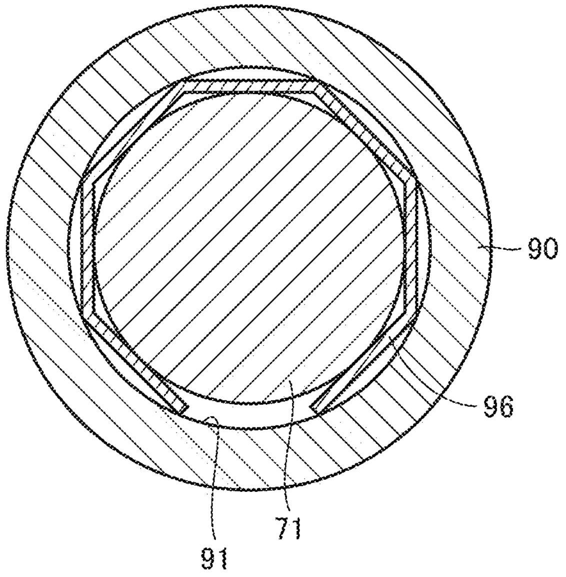
FIG. 9 is a cross-sectional view showing a construction of a resistance providing portion.

FIG. 9 is a cross-sectional view showing a construction of a resistance providing portion. FIG. 9 shows a cross-section of potentiometer 90 and shaft portion 71 inserted in shaft hole 91 in potentiometer 90. As shown in FIG. 9, a leaf spring 96 is interposed between potentiometer 90 and shaft portion 71. Leaf spring 96 is formed from an elastic thin metal plate bent into a polygonal shape. Leaf spring 96 is held in a bent state, with a center of each side being pressed radially outward by an outer circumferential surface of shaft portion 71.

When shaft portion 71 rotates relatively to potentiometer 90, friction force is produced between leaf spring 96 and shaft portion 71. This friction force increases resistance against rotation of shaft portion 71. Leaf spring 96 corresponds to the resistance providing portion in the embodiment.

According to such a construction including the resistance providing portion, movement relative to base 80 due to slip of first ball 77 while first ball 77 is not engaged with first hole 83 is suppressed. Thus, movement of first ball 77 beyond adjacent first hole 83 due to momentum at the time when first ball 77 moves to adjacent first hole 83 by an operation to turn dial main body 61 by the operator is suppressed. As a state that first ball 77 is in first hole 83 is stabilized, first ball 77 can more reliably be engaged with any one of the plurality of first holes 83.

The vehicle speed restriction dial is described by way of example of the operation apparatus in the description of the embodiment above. Without being limited to the vehicle speed restriction dial, the operation apparatus in the present disclosure may be applied to a dial apparatus of another type such as a dial indicating a torque restriction value or a fuel dial for setting the number of revolutions of the engine.

Though first hole 83 and second hole 84 provided in base 80 are defined as the first engagement portion and the second engagement portion in the embodiment, the first engagement portion and the second engagement portion are not limited to holes. Protrusions formed on the upper surface of base 80 may be defined as the first engagement portion and the second engagement portion.

The operation apparatus is not limited to the dial. For example, the operation apparatus may include an operational input portion that can slidably be operated. In this case, such a construction that the first engagement portions and the second engagement portions are each arranged as being aligned on a straight line instead of the arc and a slidably movable contact portion can relatively be engaged with any one of the first engagement portions and the second engagement portions can be realized.

A row of aligned first engagement portions and a row of aligned second engagement portions may extend in parallel. The row of aligned first engagement portions and the row of aligned second engagement portions may be provided on an identical line. The second engagement portions may be included in the row of aligned first engagement portions.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST

10 wheel loader; 12 front frame; 14 rear frame; 16 work implement; 17 engine hood; 21 boom; 22 bell crank; 23 link; 24 bucket; 25 boom cylinder; 26 bucket cylinder; 27 front wheel; 28 rear wheel; 30 cab; 32 door; 41 operator's seat; 42 seat back; 43 seat cushion; 46 armrest; 47, 53 upper surface; 51 console; 52 housing portion; 54 operation portion; 55, 56 control lever; 57 dial apparatus; 61 dial main body; 62 operation knob; 63 reference mark; 65 attachment ring portion; 70 rotational operation portion; 71 shaft portion; 72 guide cylinder; 73 spring portion; 74 pressing portion; 76 contact portion; 77 first ball; 78 second ball; 80 base; 81 insertion hole; 83 first hole; 84 second hole; 90 potentiometer; 91 shaft hole; 92 cable; 94 terminal; 96 leaf spring

The invention claimed is:

1. A work machine operation apparatus comprising:

a base including a plurality of first engagement portions each having a first dimension and a plurality of second engagement portions each having a second dimension larger than the first dimension, an interval at which two adjacent first engagement portions are arranged is smaller than an interval at which two adjacent second engagement portions are arranged;

a contact portion in contact with the base, the contact portion moving relatively to the base and being selectively engaged with any one of the plurality of first engagement portions and the plurality of second engagement portions;

a biasing portion that applies to the contact portion, biasing force in a direction in which the contact portion is brought in contact with the base; and an operational input portion that moves the contact portion relatively to the base upon accepting an input operation, wherein the plurality of first engagement portions are arranged at regular intervals, and the plurality of second engagement portions are arranged at irregular intervals.

2. The work machine operation apparatus according to claim 1, wherein the plurality of first engagement portions are arranged as being aligned, and the plurality of second engagement portions are arranged as being aligned at positions different from positions of the first engagement portions.

3. The work machine operation apparatus according to claim 1, wherein the operational input portion includes a dial that is turned and a shaft portion attached to a rotation center of the dial, the base is provided with an insertion hole in which the shaft portion is inserted, and the first engagement portions and the second engagement portions are arranged with the insertion hole lying therebetween.

4. The work machine operation apparatus according to claim 3, wherein the plurality of first engagement portions are arranged as being aligned along an arc around a center of the insertion hole, and the plurality of second engagement portions are arranged as being aligned along an arc around the center of the insertion hole.

5. The work machine operation apparatus according to claim 4, wherein the plurality of first engagement portions and the plurality of second engagement portions are arranged as being aligned on an identical circle.

6. The work machine operation apparatus according to claim 3, further comprising a resistance providing portion that increases resistance against rotation of the shaft portion.

7. The work machine operation apparatus according to claim 1, operating travel by a work machine.

8. The work machine operation apparatus according to claim 7, wherein the work machine includes a work implement, an operator's seat where an operator who operates the work machine sits, and a console arranged laterally to the operator's seat, the operation apparatus is provided on an upper surface of the console, and a control lever for controlling an operation by the work implement is further provided on the upper surface of the console.

9. The work machine operation apparatus according to claim 8, wherein the operation apparatus is arranged as being more distant from the operator's seat than the control lever and arranged in rear of the control lever.

10. A work machine comprising:

a work implement; and the operation apparatus according to claim 1.

11. The work machine according to claim 10 comprising:

a cab which an operator who operates the work machine gets in; and a console arranged in the cab, wherein the operation apparatus is attached to the console.

* * * * *